United States Patent
Åkesson

(10) Patent No.: US 11,271,761 B2
(45) Date of Patent: Mar. 8, 2022

(54) METHOD AND APPARATUS FOR POLICY MANAGEMENT FOR TEMPORARY PRODUCTS IN A TELECOMMUNICATIONS NETWORK

(71) Applicant: Telefonaktiebolaget LM Ericsson (publ), Stockholm (SE)

(72) Inventor: Gustav Åkesson, Ramdala (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 288 days.

(21) Appl. No.: 16/328,558

(22) PCT Filed: Aug. 31, 2016

(86) PCT No.: PCT/SE2016/050819
§ 371 (c)(1),
(2) Date: Feb. 26, 2019

(87) PCT Pub. No.: WO2018/044215
PCT Pub. Date: Mar. 8, 2018

(65) Prior Publication Data
US 2020/0084053 A1    Mar. 12, 2020

(51) Int. Cl.
*H04L 12/14* (2006.01)
*H04M 15/00* (2006.01)
*H04W 4/24* (2018.01)

(52) U.S. Cl.
CPC ........ *H04L 12/1407* (2013.01); *H04M 15/64* (2013.01); *H04M 15/85* (2013.01); *H04W 4/24* (2013.01)

(58) Field of Classification Search
None
See application file for complete search history.

(56) References Cited

U.S. PATENT DOCUMENTS

| | | | | |
|---|---|---|---|---|
| 8,612,612 | B1 * | 12/2013 | Dukes | H04L 67/141 709/228 |
| 9,204,280 | B2 * | 12/2015 | Lowenadler | H04M 15/43 |

(Continued)

FOREIGN PATENT DOCUMENTS

| EP | 2296309 A1 | 3/2011 |
|---|---|---|
| EP | 2605501 A1 | 6/2013 |

(Continued)

OTHER PUBLICATIONS

3GPP, "3GPP TS 23.203 V13.7.0", 3rd Generation Partnership Project; Technical Specification Group Services and System Aspects; Policy and charging control architecture (Release 13), Mar. 2016, pp. 1-242.

(Continued)

*Primary Examiner* — Kodzovi Acolatse
(74) *Attorney, Agent, or Firm* — Murphy, Bilak & Homiller, PLLC

(57) ABSTRACT

A method (300) and apparatus (40) according to this disclosure integrate policy evaluation into the process of provisioning temporary products (52) in a telecommunications network (10), in a manner that results in consumption of a temporary product (52) being governed by values of one or more policy-related parameters that are specific to the temporary product (52), rather than being governed by default values for such parameters. Accordingly, an Online Charging System, OCS, (26) includes or is associated with a network node (40) that triggers policy evaluation in conjunction with authorizing charging and policy sessions in the context of temporary product provisioning, to thereby provide the involved policy node (24) with policy-related information that is specific to the temporary product.

16 Claims, 4 Drawing Sheets

(56) References Cited

U.S. PATENT DOCUMENTS

| | | | |
|---|---|---|---|
| 2009/0190471 A1* | 7/2009 | Mahendran | H04L 47/14 370/230.1 |
| 2010/0235877 A1* | 9/2010 | Hu | H04L 63/102 726/1 |
| 2011/0067085 A1* | 3/2011 | Brouard | H04L 12/1403 726/1 |
| 2013/0117092 A1 | 5/2013 | Cai et al. | |
| 2014/0040975 A1* | 2/2014 | Raleigh | G06Q 30/016 726/1 |
| 2014/0335815 A1* | 11/2014 | Ephraim | H04M 15/66 455/406 |
| 2015/0087260 A1* | 3/2015 | Lowenadler | H04M 15/61 455/406 |
| 2015/0120727 A1 | 4/2015 | Shinde et al. | |
| 2016/0007137 A1* | 1/2016 | Ahn | H04L 41/0681 370/254 |
| 2016/0112896 A1* | 4/2016 | Karampatsis | H04W 28/0289 370/230.1 |
| 2016/0127564 A1* | 5/2016 | Sharma | H04W 4/24 455/406 |
| 2016/0352924 A1* | 12/2016 | Senarath | H04M 15/8033 |
| 2016/0353268 A1* | 12/2016 | Senarath | H04L 41/5051 |
| 2017/0289278 A1* | 10/2017 | Rasanen | H04L 43/028 |
| 2018/0069714 A1* | 3/2018 | Kumar | H04L 12/1467 |
| 2018/0176389 A1* | 6/2018 | Kumar | H04M 15/765 |
| 2019/0259097 A1* | 8/2019 | Raleigh | G06Q 20/0855 |
| 2020/0107226 A1* | 4/2020 | Raleigh | H04W 28/10 |

FOREIGN PATENT DOCUMENTS

| | | |
|---|---|---|
| EP | 3269086 A1 | 1/2018 |
| WO | 2016148613 A1 | 9/2016 |

OTHER PUBLICATIONS

3GPP, "3GPP TS 29.212 V13.5.0", 3rd Generation Partnership Project; Technical Specification Group Core Network and Terminals; Policy and Charging Control (PCC); Reference points (Release 13), Mar. 2016, pp. 1-257.

3GPP, "3GPP TS 29.219 V13.3.0", 3rd Generation Partnership Project; Technical Specification Group Core Network and Terminals; Policy and Charging Control: Spending Limit Reporting over Sy reference point (Release 13), Mar. 2016, pp. 1-22.

Unknown, Author, "Clarification on PCC Rule Authorization for SDFs not known at PCRF", 3GPP TSG-CT WG3 Meeting #49, C3-081500, Ericsson, Budapest, Hungary, Aug. 18-22, 2008, 3 pages.

* cited by examiner

METHOD AND APPARATUS FOR POLICY MANAGEMENT FOR TEMPORARY PRODUCTS IN A TELECOMMUNICATIONS NETWORK

TECHNICAL FIELD

The present invention relates to telecommunications networks and particularly relates to policy management for temporary products provisioned in such networks.

BACKGROUND

Certain communication services may be offered to the subscribers of a given communication network according to "product offerings." For example, mobile broadband connectivity may be offered to individual subscribers of a cellular or other wireless or wired communication network in defined blocks of time, e.g., hourly. Alternatively, the product offering may be based on discrete blocks of data transfer amounts. For example, the "product" in question comprises one (1) day of data connectivity, which may be subject to a usage cap, or the "product" comprises one (1) Gigabyte of data connectivity, which may be subject to a defined validity period or expiration time.

While the telecommunications network could pre-provision such products for all or some of its subscribers, doing so imposes undesirable complexity and resource overhead, as a consequence of the need for creating, tracking, and reconciling the pre-provisioned products. As an alternative, so-called "temporary products" that are provisioned speculatively for given users, e.g., in response to a charging trigger or on some other basis. If the subscriber uses all or part of the temporary product, the product-appropriate charging records are generated. Otherwise, the temporary product expires, and the associated database entries are deleted. The U.S. Pat. No. 9,204,280 B2 provides example details regarding temporary products, and their creation in the context of service-triggered provisioning.

While temporary products offer certain advantages, they also present challenges in the context of established network operations and protocols. For example, existing communications networks commonly employ policy and charging controls that determine how and under what conditions subscribers and applications use network resources. Example details are found in following Third Generation Partnership Project, 3GPP, Technical Specifications: TS 23.203, detailing the 3GPP policy and charging control architecture, TS 29.212, detailing the 3GPP policy and charging control reference points, and TS 29.219, detailing the 3GPP spending limit reporting over the "Sy" interface.

As a particularly problematic issue recognized herein, policy management is not well integrated into the process for provisioning temporary products. Consequently, rather than consumption of the temporary product being governed by specific values of certain policy-related parameters that affect consumption of the temporary product by the subscriber, consumption ends up being governed by default values for the parameter(s) in question. In other words, in conventional approaches to provisioning and using temporary products, certain policy decisions lag consumption of the temporary product by the involved user. Consequently, the appropriate policy settings may not be applied to consumption of the product.

SUMMARY

A method and apparatus according to this disclosure integrate policy evaluation into the process of provisioning temporary products in a telecommunications network, in a manner that results in consumption of a temporary product being governed by values of one or more policy-related parameters that are specific to the temporary product, rather than being governed by default values for such parameters. Accordingly, an Online Charging System, OCS, includes or is associated with a network node that triggers policy evaluation in conjunction with authorizing charging and policy sessions in the context of temporary product provisioning, to thereby provide the involved policy node with policy-related information that is specific to the temporary product.

In an example embodiment, a method of policy management for temporary products includes providing default policy-related information to a policy node with respect to establishing an initial policy session for a user in advance of a temporary product being provisioned for the user, and subsequently provisioning the temporary product for the user in association with a charging session being established for the user at a service node. Here, it will be understood that a "temporary" product is one that is provisioned by the network on a speculative basis, and it should be noted that the method is performed by a network node associated with online charging in the network.

The method further includes determining updated policy-related information to be applied to any consumption of the temporary product by the user and sending the updated policy-related information to the policy node, to govern consumption of the temporary product by the user according to the updated policy-related information rather than the default policy-related information. The word "updated" as used here denotes the fact that the updated policy-related information is updated with respect to the default information initially provided to the policy node. For example, the default policy-related information comprises a default value for one or more policy-related parameters and the updated policy-related information comprises a non-default value for the one or more policy-related parameters. Here, "non-default" means something that is specifically associated with the temporary product in question, e.g., product-specific values for the involved policy-related parameters.

In a corresponding example, a network node is configured for operation in an online charging system of a telecommunications network. The network node in an example embodiment comprises communication interface circuitry that is configured for exchanging messages with one or more other types of nodes in the network. The network node further includes processing circuitry that is operatively associated with the communication interface circuitry and configured to perform certain operations according to the teachings herein.

In particular, the processing circuitry is configured to provide default policy-related information to a policy node with respect to establishing an initial policy session for a user in advance of a temporary product being provisioned for the user, and subsequently provision the temporary product for the user in association with a charging session being established for the user at a service node. The processing circuitry is further configured to determine updated policy-related information to be applied to any consumption of the temporary product by the user, and send the updated policy-related information to the policy node, to govern consumption of the temporary product by the user according to the updated policy-related information rather than the default policy-related information.

Of course, the present invention is not limited to the above features and advantages. Indeed, those skilled in the art will recognize additional features and advantages upon reading the following detailed description, and upon viewing the accompanying drawings.

DETAILED DESCRIPTION

Figure 1:
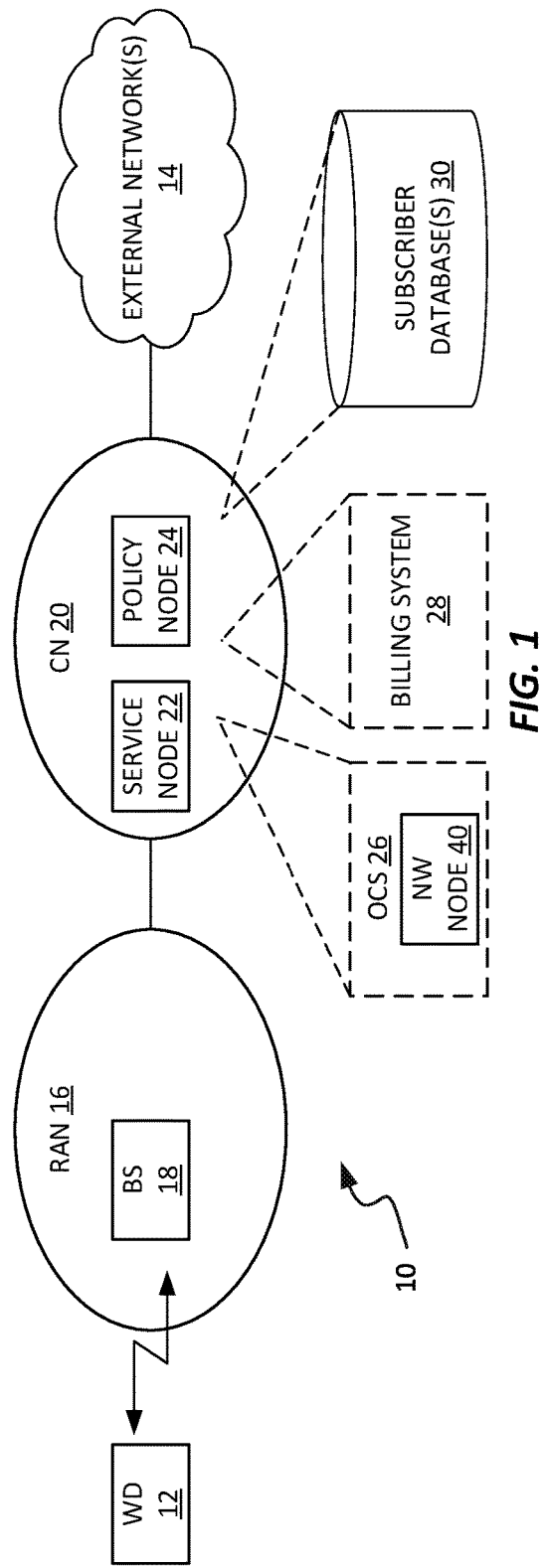
FIG. 1 is a block diagram of one embodiment of a telecommunications network that includes an Online Charging System (OCS) node configured according to the teachings herein.

FIG. 1 illustrates an example embodiment of a telecommunications network 10—network 10—that provides communication services to one or more wireless devices 12, where the diagram depicts only one wireless device 12 for simplicity. By way of example, the network 10 communicatively couples the wireless devices 12 to one or more external networks 14, such as the Internet, and the wireless devices 12 run applications that make use of services and data provided by various Internet-based servers, devices, or systems. While not so limited, the network 10 in one or more examples comprises a wireless communication network based on one or more standards promulgated by the Third Generation Partnership or 3GPP, such as the UTRAN or LTE standards. Here, "UTRAN" denotes "UMTS Terrestrial Radio Access Network" and "UMTS" denotes "Universal Mobile Telecommunications System", and "LTE" denotes "Long Term Evolution".

The network 10 includes a Radio Access Network or RAN 16, which includes a number of base stations or other radio access points 18. Again, for simplicity, FIG. 1 depicts a single base station or BS 18. The RAN 16 communicatively couples to a Core Network or CN 20, which may be a complex arrangement of multiple kinds of nodes, systems, or subsystems. Here, however, the diagram focuses on example nodes and systems of particular interest in this disclosure. Correspondingly, one sees a service node 22, a policy node 24, an Online Charging System or OCS 26, and a billing system 28.

The service node 22 may also be referred to as a "service-related node" and, likewise, the policy node 24 may also be referred to as a "policy-related node". The service node 22 may be any of several different types of nodes in the CN 20 that are associated directly with providing communication services—i.e., they convey or process user traffic going between the network 10 and the wireless device 12. By way of example, the service node 22 comprises a Packet Gateway such as a PDN Gateway (PGW) in an Evolved Packet Core (EPC) network or a Gateway GPRS Support Node (GGSN) in a GPRS network that is configured to carry packet flows going to or from given wireless devices 12.

The policy node 24 may be included in or associated with the service node 22, or may be implemented separately from the service node 22. In either case, the policy node 24 is responsible for applying or setting one or more policy-related parameters, to govern the use of network resources according to the applicable policies. In one example, the policy node 24 comprises or otherwise operates as a Policy Charging and Rules Function, PCRF. In another example, the policy node 24 comprises or otherwise operates a Policy Charging and Enforcement Function or PCEF. For PCRF and PCEF details, see the 3GPP TSs 23.203, 29.212, and 29.219.

The CN 20 further includes or is associated with various databases or other information repositories, such as a subscriber database 30, which includes subscriber profiles or other subscriber-specific information. Here, a "subscriber" is a person or other entity that pays for or is otherwise contracted for accessing and using the network 10, and unless finer distinctions are needed, the terms "user" and "subscriber" are interchangeable, and the depicted wireless device 12 may be understood as being or at least representing a user of the network 10. Consequently, a wireless device 12 also may be referred to as a "user 12".

Of particular interest in FIG. 1, a network node 40 is configured according to the teachings herein to apply policy evaluation during the provisioning of temporary products, so that product-specific values of one or more policy-related parameters are used to govern consumption of a temporary product. This advantageous approach contrasts with conventional approaches to provisioning temporary products in which product-specific policy evaluations are not triggered when provisioning temporary products and, consequently, default rather than product-specific parameter values are used to govern temporary product consumption. While FIG. 1 depicts the network node 40, denoted as "NW NODE 40", as comprising or being included in the OCS 26. It may be implemented outside the OCS 26 but the network node 40 operates in association with the OCS 26, for purposes of performing the advantageous policy evaluations.

Figure 2:
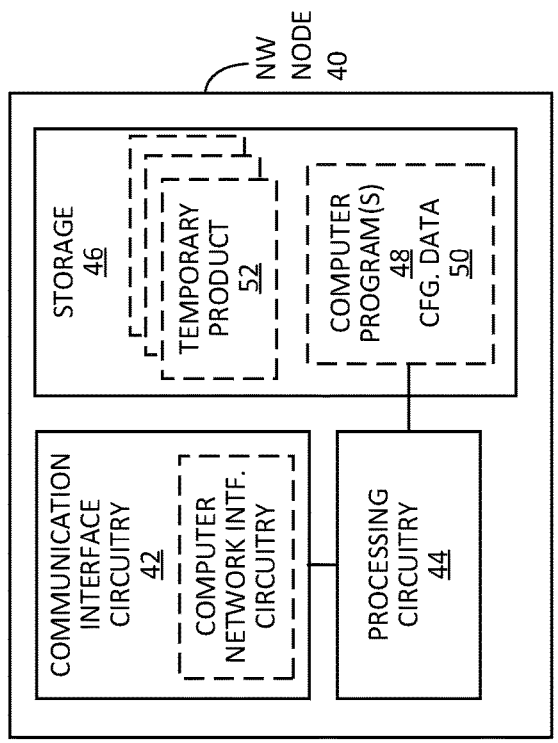
FIG. 2 is a block diagram of example details for the OCS node of FIG. 1.

FIG. 2 illustrates an example arrangement for the network node 40, wherein the network node 40 comprises communication interface circuitry 42, processing circuitry 44, and storage 46, which in at least some embodiments is used to store any one or more of a computer program 48, configuration data 50, and temporary products 52. The network node 40 may be a standalone node or may be integrated into or co-located with one or more other nodes, and may perform or be involved in processing operations beyond those of particular interest herein. In one or more embodiments, the network node 40 is a computer server or other computer-based system that is specially adapted to carry out the processing described herein.

Broadly, the processing circuitry 44 comprises fixed circuitry, programmed circuitry, or a mix of fixed and programmed circuitry. In some embodiments, the processing circuitry comprises one or more microprocessors, Field Programmable Gate Arrays or FPGAs, Application Specific Integrated Circuits or ASICs, or other digital processing circuitry that is at least partly configured based on the execution of computer program instructions comprising the computer program(s) 48, as stored in the storage 46. To that end, the storage 46 will be understood as comprising one or more types of computer-readable media that provide non-transitory storage for the computer program 48. Here, non-transitory means storage of some persistence, although not necessarily permanent or unchanging storage. For example, the storage 46 may include a mix of non-volatile or long-term storage and temporary, volatile storage, such as working memory for program execution.

The communication interface circuitry 42 includes, for example, computer network interface circuitry, and in some embodiments is configured to support DIAMETER-based communications with a PCRF over a standardized "Sy" interface—or Ericsson-specific "ESy" interface. Additionally, or in the alternative, the communication interface circuitry 42 is configured to support DIAMETER-based communications with a PCEF over a standardized "Gx" interface. Such communications may apply particularly when the network node 40 is co-located with a PCRF and provides policy-related information to a PCEF over the Gx interface.

The processing circuitry 44 is operatively associated with the communication interface circuitry 42, e.g., so as to receive messages from other nodes and transmit messages to other nodes. Further, in at least some embodiment, the processing circuitry 44 is configured to provide default policy-related information when establishing a policy session with a policy node 24, in advance of any temporary product 52 having been provisioned for the involved user 12, and then, advantageously, provide updated policy-related information to the policy node 24, in conjunction with provisioning the temporary product 52. For example, the processing circuitry 44 performs or otherwise triggers a policy evaluation in conjunction with provisioning the temporary product 52 and establishing a charging session for the user 12, based on the temporary product 52.

The default policy-related information comprises or is derived from values for one or more policy-related parameters, where the values are not product-specific. In contrast, the updated policy-related information comprises or is derived from product-specific values for the one or more policy-related parameters. By way of non-limiting example, the default policy-related information comprises a default value for any one or more of a QoS setting, a Policy Charging and Control, PCC, rule, a policy counter used for controlling credit authorization or the corresponding policy counter status, and a policy group indicator used for identifying applicable policies or policy values. Here, saying that the policy-related information "comprises" certain items or values should be understood as meaning that the policy-related information conveys or otherwise indicates the involved information.

For example, a PCC rule may be expressed as a label that identifies or maps to a rule configured in the PCRF, and the OCS 26/network node 40 may send the label or an identifier rather than sending the rule itself. In this respect, it may be helpful to note that Release 11 of the 3GPP specifications added the PCC feature, and it allows the PCRF to base policy decisions on "spending" limits, which may be expressed as usage limits in terms of money, duration, volume, etc. That is, the PCRF takes actions related to spending limits that are maintained in the OCS 26 and these actions involve policy decisions. For example, when "spending" by the involved user 12 passes a certain threshold up or down, the PCRF may initiate a modification of resources provided to the user 12, such as by changing the QoS, bandwidth, etc.

Whether it be a PCC rule or other policy-related parameter(s), the default value(s) of such parameters are not targeted to or specific to the temporary product 52 being provisioned for the user. Consequently, if they were applied to consumption of the temporary product 52, the user 12 may be denied full utilization or enjoyment of the temporary product 52, e.g., the user 12 would experience a data rate cap or QoS lower than specified for the temporary product 52. In contrast, the updated policy-related information comprises or is derived from values for the same one or more policy parameters that are specific to the temporary product 52, e.g., a QoS setting that the network operator has predefined for the temporary product 52, where pricing of the temporary product 52 assumes that the QoS setting will be met during consumption of the temporary product 52.

With the above examples in mind, the processing circuitry 44 is configured to provide default policy-related information to a policy node 24 with respect to establishing an initial policy session for a user 12 in advance of a temporary product 52 being provisioned for the user 12. As noted before, temporary products 52 are speculatively provisioned and may or may not be used. Further, provisioning a temporary product 52 may be understood as creating the necessary database entries or creating other record information, as needed, to represent the temporary product 52 and, ultimately, make it available for consumption.

The processing circuitry 44 is further configured to provision the temporary product 52 subsequently for the user 12, in association with a charging session being established for the user 12 at a service node 22. The processing circuitry 44 is also configured to determine updated policy-related information to be applied to any consumption of the temporary product 52 by the user 12. Correspondingly, the processing circuitry 44 is configured to send the updated policy-related information to the policy node 24, to govern consumption of the temporary product 52 by the user 12 according to the updated policy-related information rather than the default policy-related information. As noted by way of example, the temporary product 52 may specify any one or more of a certain QoS, a certain PCC rule, a certain policy counter used for credit control and charging or the corresponding policy counter status, a certain policy group indicator that specifies the policy to be applied, etc. The value(s) of the parameter(s) as defined or configured for the temporary product 52 constitute non-default, i.e., product-specific parameter values.

Thus, in an example embodiment, to provide the default policy-related information, the processing circuitry 44 is configured to send a default value for one or more policy-related parameters to the policy node 24, the default value not being specific to the temporary product 52. To provide the updated policy-related information, the processing circuitry 44 is configured to send a non-default value for the one or more policy-related parameters, the non-default values being specific to the temporary product 52.

In one example embodiment or instance, the policy node 24 operates as a PCRF, the default policy-related information comprises a policy counter status or policy group indicator not specific to the temporary product 52, and the updated policy-related information comprises a policy counter status or policy group indicator specific to the temporary product 52. For example, the processing circuitry 44 is configured to send a spending limit answer to the PCRF in response to receiving an initial spending limit request from the PCRF, the spending limit answer reflecting default values of one or more policy-related parameters. With respect to sending the updated policy-related information, the processing circuitry 44 is configured to subsequently send a spending notification request to the PCRF, the spending notification request initiated in response to establishment of a credit-control session and reflecting non-default values of the one or more policy-related parameters.

In another example embodiment or instance, the policy node 24 operates as a PCEF, e.g., in or co-located with a PGW operating as the service node 22. The default policy-related information comprises, for example, a QoS parameter or PCC rule that is not specific to the temporary product 52, the updated policy-related information comprises a QoS parameter or PCC rule that is specific to the temporary product 52.

In at least some embodiments, with respect to subsequently provisioning the temporary product 52 for the user 12, the processing circuitry 44 is configured to set a validity time for the temporary product 52. For example, the validity time is expressed as an expiration date or the validity time is expressed as a validity period timed from the provisioning event.

In the same or other embodiments, the processing circuitry 44 is configured to assess any reported usage of the temporary product 52 against the temporary product 52 and thereby change the temporary product 52 into a non-temporary product, for charging purposes. That is, if the involved user 12 consumes all or a portion of the temporary product 52, the temporary product 52 is no longer temporary and, instead, becomes a regular or normal product for which finalized charging data records or other finalized accounting and billing records are generated.

Further, in at least some embodiments, to subsequently provision the temporary product 52 for the user 12, the processing circuitry 44 is configured to receive a credit control request from the service node 22, determine that a subscriber account associated with the user 12 has sufficient credit for the temporary product 52 to be provisioned and correspondingly provision the temporary product 52, and return a credit control answer to the service node 22. Still further, in the same or in other embodiments, the processing circuitry 44 is configured to send the updated policy-related information to the policy node 24 for any subsequent temporary products 52 provisioned responsive to consumption of the temporary product 52.

Figure 3:
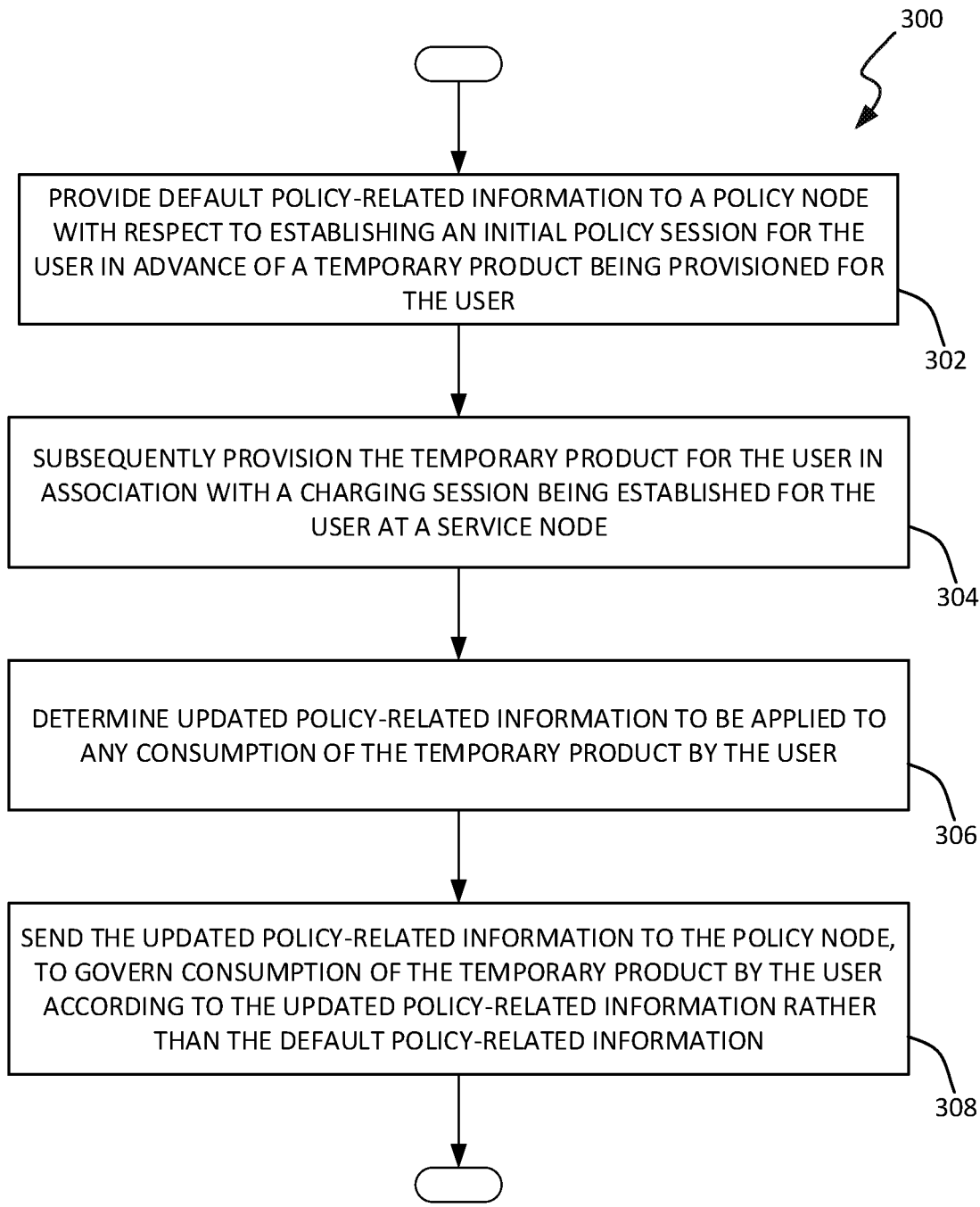
FIG. 3 is a logic flow diagram of one embodiment of a policy-management method.

FIG. 3 illustrates an example embodiment of a method 300, which may be implemented by the network node 40 of FIGS. 1 and 2, based on computer program execution, or by another node having a suitable arrangement of processing and communication circuitry. One or more steps of the method 300 may be performed in an order different than that suggested by the illustration. Further, one or more steps of the method 300 may overlap or be performed at least partly together. Additionally, it should be appreciated that the method 300 pertains to an example instance of the processing at issue herein and it may be repeated in whole or in part for further temporary product provisioning for the same user 12, and further instances of the same processing may be performed for other users 12.

The method 300 includes providing (Block 302) default policy-related information to a policy node 24 with respect to establishing an initial policy session for a user 12 in advance of a temporary product 52 being provisioned for the user 12, and further includes subsequently provisioning (Block 304) the temporary product 52 for the user 12 in association with a charging session being established for the user 12 at a service node 22. Still further, the method 300 includes determining (Block 306) updated policy-related information to be applied to any consumption of the temporary product 52 by the user 12, and sending (Block 308) the updated policy-related information to the policy node 24, to govern consumption of the temporary product 52 by the user 12 according to the updated policy-related information rather than the default policy-related information.

Figure 4:
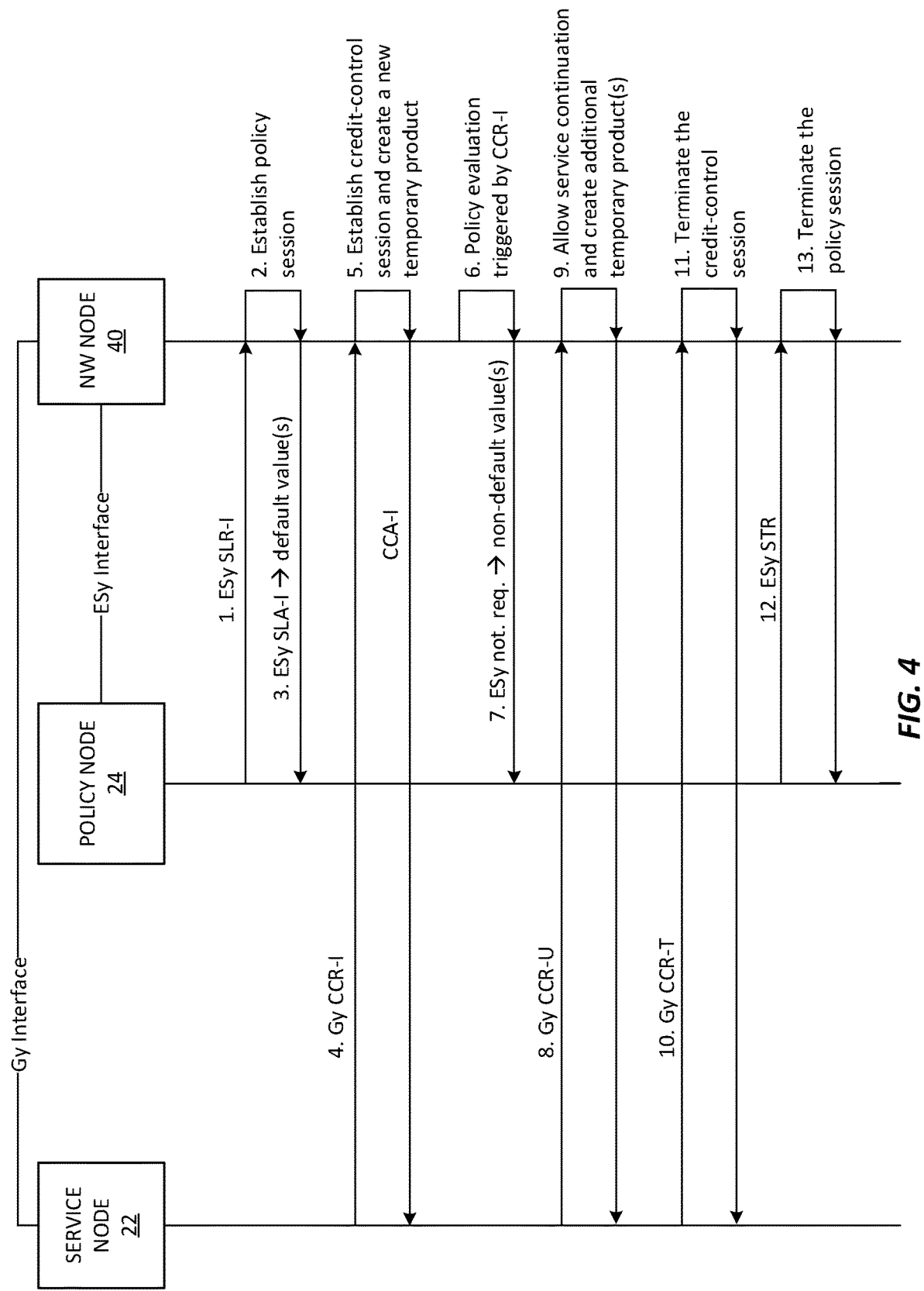
FIG. 4 is a signal flow diagram of one embodiment of policy management.

FIG. 4 illustrates signaling according to one or more embodiments, with a focus on the policy node 24 comprising or otherwise operating as a PCRF and with the network node 40 communicating with the policy node 24 via the "ESy" interface, which is an implementation by Ericsson AB of the standard 3GPP Sy interface. Here, the service node 22 comprises, for example, a PGW in the CN 18 and it may also include a policy-related node or function, such as a PCEF with which the network node 40 communicates via a "Gy" interface. At Step 1, the PCRF sends an initial ESy Spending Limit Request (SLR-I) towards the OCS 26/network node 40, to establish a policy session for a given user 12. At Step 2, the OCS 26/network node 40 evaluate the request and establish the corresponding policy session. No products are available at this point because the charging session is not yet established with the service node 22—note that the charging session may also be referred to as "charging authorization session" or as a "credit control session".

Accordingly, the policy session is established according to default policy settings, and the initial Spending Limit Answer (SLA-I) returned by the network node 40 to the policy node 24 for initial policy establishment is based on default policy-related information, e.g., one or more default settings configured by the network operator. The initial use of default values is fine, at least at this point in the flow, because the charging session has not yet been established for the user 12.

After policy session establishment, the service node 22 at Step 4 initiates set up of the charging session by sending an initial Gy Credit Control Request (CCR-I) to the OCS 26/network node 40. At Step 5, the network node 40 evaluates the session setup attempt and creates a temporary product 52, i.e., a speculative product representing a data or other communication service to be provided to the user 12. The temporary product 52 has a set validity time for e.g. one day. Charging validity-time and quota information is included in the initial Credit Control Answer (CCA-I) returned by the OCS 26/network node 40 for initial establishment of the charging session.

A distinct disadvantage of the convention signal flow is that no policy evaluation is triggered in association with provisioning the temporary product 52, or evaluation based on default policy-related information is done. Consequently, in a conventional network, the network 10 would govern any consumption of the temporary product 52 using the default policy-related information provided by the network node 40 to the policy node 24 in Step 3.

In contrast, according to at least some embodiment disclosed herein, the network node 40 performs or otherwise triggers a policy evaluation for the temporary product 52, in conjunction with establishing the charging session for the user 12. Performing the policy evaluation—which can be regarded as a "re-evaluation" done in response to provisioning the temporary product 52—allows the network node 40 to determine updated policy-related information for the temporary product 52, in advance of any consumption of the temporary product 52.

Step 6 illustrates the policy evaluation, as triggered by the CCR-I received by the OCS 26/network node 40 in Step 4, and the corresponding sending of a notification request to the policy node 24 at Step 7. The network node 40 sends the request message over the ESy interface and it comprises, indicates, or otherwise depends on the updated policy-related information that is non-default, i.e., specific to the temporary product 52. For example, the message reflects one or more policy-related decisions taken by the network node 40 in dependence on one or more policy-related parameter values that are specifically configured or defined for the temporary product 52 in question. In conventional networks, product-specific policies get applied to non-temporary products, but not to temporary products.

The illustrated signaling flow assumes that the user 12 at least partly consumes the temporary product 52, and Step 8 reflects this possibility by illustrating the service node 22 sending an update Gy Credit Control Request (CCR-U) to the OCS 26/network node 40, to authorize charging for consumption of the temporary product 52.

The temporary product 52 created responsive to the CCR-I is now formally used, with consumption reported in CCR-U, and the OCS 26/network 40 transform it from a temporary product 52 into a non-temporary product, meaning that finalized records for charging, etc. will be generated for it. All usage between CCR-I and CCR-U is reported on the product. However, the network node 40 may provision a new temporary product 52 for the next period, e.g., valid for e.g. one day. The network node 40 may perform a policy re-evaluation for each subsequently provisioned temporary product 52, but need not send updated policy-related information to the policy node 24, unless there are any updates relative to the updated policy-related information provided to the policy node 24 at Step 7 for the initially-provisioned temporary product 52. Of course, in this context, each subsequently provisioned temporary product 52 is of the same type as the initially provisioned temporary product 52 and, consequently, the policy-related information for the subsequent temporary products 52 is the same as that for initially provisioned temporary product 52.

At Step 10, the user 12 cancels or terminates the service session being charged, e.g. by disconnecting from the network 10 or by ending the involved application(s), and the service node 22 correspondingly sends a terminate Gy Credit Control Request (CCR-T) to OCS 26/network node 40. At Step 11, the OCS 26/network node 40 terminate the charging session, and at Steps 12 and 13 the OCS 26/network node 40 terminate the policy session.

FIG. 4 demonstrates one example of synchronizing policy management decisions with the provisioning of temporary products created by charging authorization. The technique allows product-specific policy information to be applied to the involved temporary product 52 before any consumption of the temporary product 52, as compared to having to wait some indeterminate time for receiving a CCR-U subsequent to the CCR-I that triggered the provisioning of the temporary product 52. The technique allows the OCS 26 and any involved policy node(s) 24 to have a common view of temporary products 52 created using service-triggered provisioning. Absent the disclosed technique, at least initial consumption of temporary products 52 by users 12 will be governed by default policy-related information rather than being governed by updated policy-related information that reflects product-specific policy settings or values.

Figure 5:
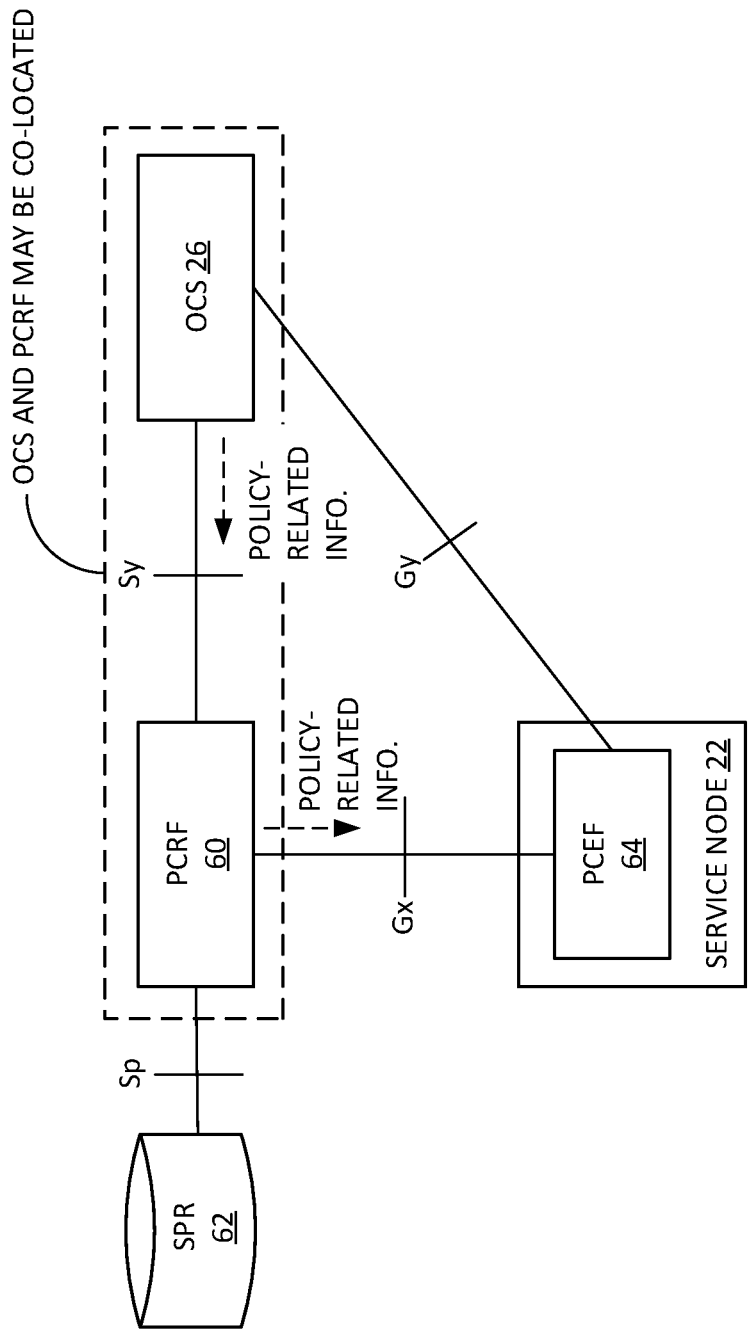
FIG. 5 is a block diagram of additional example embodiments of an OCS and associated policy and service-related nodes.

FIG. 5 provides further example details in the context of a 3GPP-based policy and charging architecture. Among the depicted entities, a PCRF 60 may be co-located with the OCS 26, and it is communicatively coupled to a Subscriber Profile Repository or SPR 62 via a "Sp" interface. The PCRF 60 is also communicatively coupled to the OCS 26 via a "Sy" interface and to a PCEF 64 via a "Gx" interface. The PCEF 64 may be integrated into or otherwise co-located with a service node 22, such as where a PGW includes a PCEF. The PCEF 64 is also communicatively coupled to the OCS 26 through a "Gy" interface.

In the context of FIG. 5, the network node 40 is not shown explicitly because it may be implemented such that it operates "towards" the PCRF 60 over the Sy interface. In such cases, the policy-related information provided in default and updated forms may comprise one or more policy counter status values, policy group indicator values, etc. The network node 40 also may be implemented such that it operates towards the PCEF 64 over the Gx interface. In such cases, the policy-related information provided in default and updated forms may comprise one or more QoS settings, PCC rules, etc.

In more detail, according to 3GPP TS 29.212, the Gx reference point is located between the PCRF and PCEF and is used for provisioning and removal of PCC rules from the PCRF to the PCEF and the transmission of traffic plane events from the PCEF to the PCRF. The Gx reference can be used for charging control, policy control or both by applying AVPs relevant to the involved applications. Further, according to 3GPP TS 29.219, a policy counter is a mechanism used within OCSs to track spending applicable for given subscribers, a policy counter identifier serves as a reference to a policy counter in the OCS for a subscriber, and a policy counter status serves as a label associated with a given policy counter's value.

In an example embodiment or instance where the policy-related information is conveyed by the network node 40 towards a PCRF 60 operating as the policy node 24, the network node 40 conveys policy counter statuses rather than the policy counter values. Example statuses include, for example, EMPTY, LOW, SAFE, and so on. The policy counter status allows the PCRF 60 to take policy decisions on what policy to apply. Thus, in one example that can be mapped for illustrative purposes back to the signaling seen in FIG. 4, the network node 40 at Step 3 provides the policy node 24 with default policy-related information comprising a policy counter status that refers to the status of a policy counter that is not tied to the temporary product 52 to be provisioned. It could for example be the status of a general monthly data volume counter which all subscribers may have for their accounts—which may be LOW if the involved subscriber—user 12—has used her monthly quota.

Continuing the same example, the updated policy-related information sent in Step 7 may be the status of a counter holding the consumption for a product "10 GB until the end of the month," which may be SAFE if most of the 10 GB is unused. More broadly, in the context of this example, the policy counter status sent in Step 7 will have specific relevance to consumption of the temporary product 52 provisioned in Step 5 for the user. Further, in embodiments or instances where the policy-related information instead comprises a policy group indicator, the updated policy-related information identifies the policy to be applied—i.e., the OCS 26/network node 40 control the policy to be applied by the PCRF 60 by sending the appropriate indicator to the PCRF 60.

Notably, modifications and other embodiments of the disclosed invention(s) will come to mind to one skilled in the art having the benefit of the teachings presented in the preceding descriptions and the associated drawings. Therefore, it is to be understood that the invention(s) is/are not to be limited to the specific embodiments disclosed and that modifications and other embodiments are intended to be included within the scope of this disclosure. Although specific terms may be employed herein, they are used in a generic and descriptive sense only and not for purposes of limitation.

What is claimed is:

1. A method of policy management for temporary products in a telecommunications network, the method performed by a network node associated with online charging in the telecommunications network and comprising:

providing default policy-related information to a policy node with respect to establishing an initial policy session for a user in advance of a temporary product being provisioned for the user;

subsequently provisioning the temporary product for the user in association with a charging session being established for the user at a service node;

determining updated policy-related information to be applied to any consumption of the temporary product by the user; and sending the updated policy-related information to the policy node, to govern consumption of the temporary product by the user according to the updated policy-related information rather than the default policy-related information;

wherein providing the default policy-related information comprises sending a default value for one or more policy-related parameter to the policy node, the default value not being specific to the temporary product, and wherein sending the updated policy-related information comprises sending a non-default value for the one or more policy-related parameter, the non-default value being specific to the temporary product.

2. The method of claim 1, wherein the policy node operates as a Policy Charging and Rules Function (PCRF), the default policy-related information comprises a policy counter status or a policy group indicator, where the policy counter status or policy group indicator is not specific to the temporary product, and the updated policy-related information comprises a policy counter status or policy group indicator, where the policy counter status or policy group indicator is specific to the temporary product.

3. The method of claim 2, wherein providing the default policy-related information comprising sending a spending limit answer to the PCRF in response to receiving an initial spending limit request from the PCRF, the spending limit answer reflecting default values of one or more policy-related parameters, and wherein sending the updated policy-related information comprises subsequently sending a spending notification request to the PCRF, the spending notification request reflecting non-default values of the one or more policy-related parameters.

4. The method of claim 1, wherein the policy node operates as a Policy Charging and Enforcement Function (PCEF), the default policy-related information comprises a Quality-of-Service (QoS) parameter or Policy Charging and Control (PCC) rule not specific to the temporary product, and the updated policy-related information comprises a QoS parameter or PCC rule specific to the temporary product.

5. The method of claim 1, wherein subsequently provisioning the temporary product for the user includes setting a validity time for the temporary product.

6. The method of claim 1, wherein the method comprises assessing any reported usage of the temporary product against the temporary product and thereby changing the temporary product into a non-temporary product, for charging purposes.

7. The method of claim 1, wherein subsequently provisioning the temporary product for the user comprises:

receiving a credit control request from the service node;

determining that a subscriber account associated with the user has sufficient credit for the temporary product to be provisioned and correspondingly provisioning the temporary product; and returning a credit control answer to the service node.

8. The method of claim 1, further comprising sending the updated policy-related information to the policy node for any subsequent temporary products provisioned responsive to consumption of the temporary product.

9. A network node configured for operation in an online charging system of a telecommunications network, the network node comprising:

communication interface circuitry configured for exchanging messages with one or more other types of nodes in the telecommunications network; and processing circuitry that is operatively associated with the communication interface circuitry and configured to:

provide default policy-related information to a policy node with respect to establishing an initial policy session for a user in advance of a temporary product being provisioned for the user;

subsequently provision the temporary product for the user in association with a charging session being established for the user at a service node;

determine updated policy-related information to be applied to any consumption of the temporary product by the user; and send the updated policy-related information to the policy node, to govern consumption of the temporary product by the user according to the updated policy-related information rather than the default policy-related information;

wherein, to provide the default policy-related information, the processing circuitry is configured to send a default value for one or more policy-related parameters to the policy node, the default value not being specific to the temporary product, and, to provide the updated policy-related information, the processing circuitry is configured to send a non-default value for the one or more policy-related parameters, the non-default value being specific to the temporary product.

10. The network node of claim 9, wherein the policy node operates as a Policy Charging and Rules Function (PCRF), the default policy-related information comprises a policy counter status or a policy group indicator, where the policy counter status or policy group indicator is not specific to the temporary product, and the updated policy-related information comprises a policy counter status or a policy group indicator, where the policy counter status or policy group indicator is specific to the temporary product.

11. The network node of claim 10, wherein, with respect to providing the default policy-related information, the processing circuitry is configured to send a spending limit answer to the PCRF in response to receiving an initial spending limit request from the PCRF, the spending limit answer reflecting default values of one or more policy-related parameters, and wherein, with respect to sending the updated policy-related information, the processing circuitry is configured to subsequently send a spending notification request to the PCRF, the spending notification request reflecting non-default values of the one or more policy-related parameters.

12. The network node of claim 9, wherein the policy node operates as a Policy Charging and Enforcement Function (PCEF), the default policy-related information comprises a Quality-of-Service (QoS) parameter or Policy Charging and Control (PCC) rule not specific to the temporary product, and the updated policy-related information comprises a QoS parameter or PCC rule specific to the temporary product.

13. The network node of claim 9, wherein, with respect to subsequently provisioning the temporary product for the user, the processing circuitry is configured to set a validity time for the temporary product.

14. The network node of claim 9, wherein the processing circuitry is configured to assess any reported usage of the temporary product against the temporary product and thereby change the temporary product into a non-temporary product, for charging purposes.

15. The network node of claim 9, wherein, to subsequently provision the temporary product for the user, the processing circuitry is configured to:
receive a credit control request from the service node;
determine that a subscriber account associated with the user has sufficient credit for the temporary product to be provisioned and correspondingly provision the temporary product; and
return a credit control answer to the service node.

16. The network node of claim 9, wherein the processing circuitry is configured to send the updated policy-related information to the policy node for any subsequent temporary products provisioned responsive to consumption of the temporary product.

\* \* \* \* \*